United States Patent Office 2,892,846
Patented June 30, 1959

2,892,846

PREPARATION OF 7-BENZYL ETHERS OF FLAVONOID COMPOUNDS

Leonard Jurd, Los Angeles, and Laurence A. Rolle, Altadena, Calif., assignors to the United States of America as represented by the Secretary of Agriculture No Drawing. Application January 14, 1958
Serial No. 708,958

3 Claims. (Cl. 260—345.2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the United States of America.

This invention relates to the synthesis of ethers of flavonoids. A particular object of the invention is the provision of novel processes for preparing 7-aralkyl, especially 7-benzyl, ethers of flavonoids. Further objects and advantages of the invention will be obvious from the description herein.

The process of the invention is demonstrated by the following example provided by way of illustration but not limitation:

*Example 1—Preparation of 7-O-benzyl quercetin*

The starting material for this synthesis was quercetin:

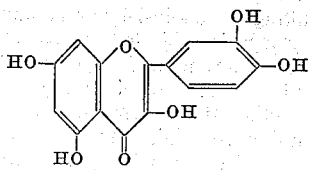

(a) Quercetin (5 g.), acetic anhydride (18 ml.) and pyridine (2 ml.) were mixed and stirred at room temperature for 5 minutes. The quercetin dissolved and the clear solution was stirred for a further 3 minutes when crystallization of the product began. Water (30 ml.) was added and the precipitate was collected. After washing the precipitate with water and dilute hydrochloric acid, the product was crystallized successively from acetone-methanol and from benzene-hexane. Quercetin-3,3',4',7-tetraacetate was thereby obtained as slightly yellow needles, M.P. 188–189° C. (7.5 g.: 92% yield). Its formula is

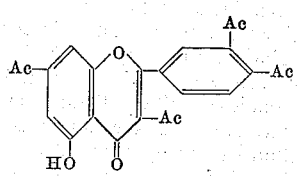

wherein Ac represents the acetoxy radical

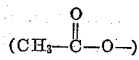

(b) Quercetin-3,3',4',7-tetraacetate (1 g.) was heated under reflux with benzyl chloride (1 ml.), potassium iodide (0.1 g.), anhydrous potassium carbonate (2.5 g.), and dry acetone (50 ml.) for 12 hours. The acetone solution was filtered from the undissolved potassium salts and evaporated to an oil. This was washed with hot hexane (three 25-ml. portions) to remove excess benzyl chloride. The hexane-insoluble residue was dissolved in boiling benzene (30 ml.), the solution was filtered and the filtrate was diluted slowly at the boiling point with hexane (60 ml.). A colorless crystalline product, M.P. 110° C., separated (0.95 g.). Purified by recrystallization from benzene-hexane the product, 7-O-benzyl-quercetin-3,3',4',5-tetraacetate, separated with solvent of crystallization and had a melting point of 115–120° C. Crystallized from methanol-acetone it is obtained as slightly yellow needles, M.P. 163–164° C. Its formula is

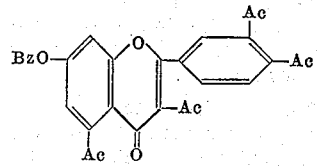

wherein Ac represents the acetyloxy radical; Bz represents the benzyl radical.

(c) The 7-O-benzyl-quercetin-3,3',4',5-tetraacetate (0.5 g.) was deacetylated by heating it on the steam bath with 10% aqueous sodium hydroxide solution (2 ml.) and methanol (5 ml.) for five minutes. The solution was acidified by dropwise addition of concentrated hydrochloric acid. Water (10 ml.) was added and the mixture cooled. The yellow crystalline product was collected and recrystallized from methanol-acetone. The product, 7-O-benzyl quercetin, was obtained as brightly yellow needles, M.P. 245° C. Its formula is

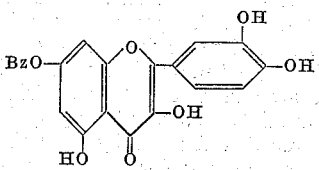

wherein Bz represents the benzyl radical.

As illustrated above, the ultimate result of the synthesis is selective etherification at position 7, that is, only the hydroxy group at position 7 is esterified; other hydroxy groups present in the starting compound are unaffected. The synthesis may be applied to any polyhydroxy flavonoid wherein there are hydroxy groups at positions 5 and 7. It is obvious that by selection of the starting material many different flavonoid-7-ethers may be prepared. Where for example the starting compound contains only hydroxyl groups, the product will contain an ether group at position 7 with retention of all other original hydroxy groups. Where the starting compound already includes ether groups, ketone groups, hydrocarbon groups or other non-reactive radicals (at positions other than 5 or 7), the product will contain the original non-reactive radicals, the new ether group at position 7 and the original hydroxy groups of the starting compound. For instance the invention can be applied: to 5,7-dihydroxy flavone for production of 5-hydroxy-7-benzyloxy flavone; to 5,7-dihydroxy-6-methoxy flavone for production of 5-hydroxy-6-methoxy-7-benzyloxy flavone; to 3,4',5,7-tetrahydroxy flavone for production of 3,4',5-trihydroxy-7-benzyloxy flavone; and so forth.

Illustrative examples of starting materials to which the synthesis of the invention may be applied are:

Flavones:

5,7-dihydroxy flavone; 5,7-dihydroxy-6-methoxy flavone; 5,7-dihydroxy-8-methoxy flavone; 4',5,7-trihydroxy flavone; 5,7-dihydroxy-4'-methoxy flavone; 5,7-dihydroxy-4'-methoxy flavone; 5,7-dihydroxy-4'-methoxy-3-acetyl flavone; 3',4',5,7-tetrahydroxy flavone; 4',5,7-trihydroxy-3'-methoxy flavone; 4',5,7-trihydroxy-3',5'-dimethoxy flavone; 3',4',5',5,7-pentahydroxy-8-methoxy flavone.

Flavonols (3-hydroxyflavones):

3,5,7-trihydroxy flavone; 5,7-dihydroxy-3-methoxy flavone; 3,4',5,7-tetrahydroxy flavone; 3,5,7-trihydroxy-4'- methoxy flavone; 2',3,5,7-tetrahydroxy flavone; 3,4',5,7-tetrahydroxy-8-methoxy flavone; 3,3',4',5,7-pentahydroxy flavone; 3,4',5,7-tetrahydroxy-3'-methoxy flavone; 3,3',5,7-pentahydroxy-8-p-hydroxybenzyl flavone; 2',3,4',5,7-pentahydroxy flavone; 3,3',4',5,6,7-hexahydroxy flavone; 3,3',4',5,7-pentahydroxy-6-methoxy flavone; 3,3',4',5,7,8-hexahydroxy flavone; 5,7-dihydroxy-3,3',4',6,8-pentamethoxy flavone; 3,3',4',5',5,7-hexahydroxy flavone.

Flavanones:
5,7-dihydroxy flavanone; 5,7-dihydroxy-6,8-dimethyl flavone, 4',5,7 - trihydroxyflavanone; 5,7 - dihydroxy-4'-methoxy flavanone; 5,7-dihydroxy-4'-methoxy-6,8-dimethyl flavanone; 3',4',5,7-tetrahydroxy flavanone; 4',5,7-trihydroxy-3'-methoxy flavanone.

Flavanonols (3-hydroxyflavanones):
3,5,7-trihydroxy flavanone; 3,4',5,7-tetrahydroxy flavanone; 3,3',4',5,7-pentahydroxy flavanone; 3,3',4',5',5,7-hexahydroxy flavanone.

Isoflavones:
4',5,7-trihydroxy isoflavone; 4',5,7-trihydroxy-8-methyl isoflavone; 5,7-dihydroxy-4'-methoxy isoflavone; 2',5,7-trihydroxy isoflavone; 3',4',5,7-tetrahydroxy isoflavone.

Regarding step (*a*) of Example 1, the aim here is to acylate all the hydroxy groups of the polyhydroxy flavonoid except that at position 5. Generally acetylation is preferred as being the most convenient technique. However, acetylation is by no means critical and the esterificaiton can be carried out with appropriate reagents to introduce acyl groups derived from formic acid, propionic acid, butyric acid, paratoluene sulphonic acid, etc. Methods to acylate all the hydroxy groups (except that at position 5) of polyhydroxy flavonoids are well known in the art and need not be explained at length herein. A convenient method of carrying out the acylation involves reacting the polyhydroxy flavonoid with the stoichiometric amount (or preferably an excess) of the acylating agent, such as acetic anhydride, under anhydrous conditions at a temperature of from 0 to 30° C. An inert solvent may be added to dissolve the reactants and thus promote intimate contact therebetween. Suitable solvents are, for example, benzene, toluene, xylene, dioxane, acetone, ether, methyl-ethyl ketone, diethyl ketone, di-isopropyl ether, diethyl ether of ethylene glycol, etc. Moreover, the inert solvent may be replaced in whole or in part by using an excess of the acylating agent (for example, acetic anhydride) to function both as a reactant and as a solvent. To promote the reaction, it is preferred to add a tertiary amine esterification catalyst such as pyridine, N-dimethyl aniline, N-dimethyl cyclohexylamine, N-methyl piperidine, quinoline, etc.

Acylation of all the hydroxy groups (except at position 5) is required to prevent etherification, as applied in the next step, at undesired positions. The selective effect of etherification is illustrated in Example 1, part (*b*). As evident therein a migration of the 7-acyl group to the 5-position takes place during the etherification. The ether group does not attach at position 5 as might be expected but at position 7 with migration of the acyl group originally at position 7 to position 5.

The etherification illustrated in part (*b*) of Example 1 may be effectuated with any desired aralkyl halide. Illustrative examples of suitable etherifying agents are represented by the formula R—X wherein X represents a halogen atom such as chlorine, bromine, or iodine and R represents an aralkyl radical such as benzyl, methylbenzyl, ethylbenzyl, isopropyl benzyl, etc.

The etherifying agent is employed in at least the stoichiometrical amount required to form the monoether. However, usually an excess is used to ensure complete reaction. Use of an excess will not raise any possibility of etherifying at sites other than position 7.

The etherification is conducted under essentially anhydrous conditions and preferably in the presence of sufficient inert solvent to dissolve the organic reactants and hence promote intimate contact therebetween. Suitable solvents are for example, benzene, toluene, xylene, dioxane, acetone, furfural, ether, methyl-ethyl ketone, diethyl ketone, di-isopropyl ether, the diethyl ether of ethylene glycol, and the like. Control of temperature is important to obtain selective etherification at position 7, that is, the temperature should not be above 60° C. At temperatures substantially above this limit, etherification at sites other than position 7 may occur. The reaction is preferably conducted under conditions of reflux and in such case the solvent employed should have a boiling point not higher than 60° C. Suitable solvents for operating under such conidtions are, for example, ether and acetone. Refluxing in acetone is preferred as the reflux temperature (56° C.) is high enough to attain a practical rate of selective etherification without danger of etherification at undesired positions.

Also to promote the etherification, an alkaline agent is added to the reaction mixture. Suitable for this purpose are potassium hydroxide, potassium carbonate, sodium hydroxide, sodium carbonate, borax, trisodium phosphate, and the like. In any event, the alkaline material should be in essentially anhydrous condition to avoid introducing moisture into the system. The amount of alkaline material should be at least that stoichiometrically required to neutralize the hydrogen halide developed in the etherification. This will require the equivalent of one mole of OH⁻ per mole of flavonoid. An excess over this amount is generally employed.

A critical feature of the invention is that the etherification agent must be an aralkyl derivative. With such agents, an ether group is introduced at position 7. Were one to use a lower alkyl halide, on the other hand, an ether group would be introduced at the 5-position.

After performing the selective etherification at position 7 the resulting flavonoid-7-ether containing one or more acyloxy groups is subjected to hydrolysis to convert the acyloxy groups to hydroxyl groups. As illustrated in Example 1, part (*c*), this can be readily accomplished by contacting the intermediate compound with an aqueous solution containing about 1 to 25% of an alkaline agent, as for example, potassium hydroxide, potassium carbonate, sodium hydroxide, sodium carbonate, trisodium phosphate, borax, ammonium hydroxide, and the like. To promote contact between the acyloxy flavonoid-7-ether and the alkali, a water-miscible solvent such as methanol, ethanol, propanol, isopropyl alcohol, acetone, etc. may be added to the reaction mixture. To expedite the hydrolysis the reaction mixture is heated to about 50–100° C.; usually heating on the steam bath is preferred. The alkaline hydrolysis produces a salt of the hydroxy flavonoid-7-ether and to convert the salt into the free hydroxy or phenol form, the hydrolysis bath is neutralized with an acid such as hydrochloric, sulphuric, phosphoric, acetic or the like.

It is evident from Example 1, taken in connection with the above description, that any polyhydroxy flavonoid having hydroxy groups at positions 5 and 7 can be converted into flavonoid-7-aralkyl ethers. These products are useful in many areas. For example, they are useful for the preparation of azo dyes and wood stains by the procedures disclosed in Patents Nos. 2,723,898 and 2,723,899. Moreover, many of the products exhibit antioxidant properties and hence can be incorporated with various substances normally susceptible to oxidative deterioration whereby to prevent such deleterious effects as rancidification of fatty components, destruction of carotene, vitamins, and vitamin precursors, etc. For such purposes, the products may be incorporated in minor proportion (about 0.01 to 0.1%) in oxidation-susceptible materials, for example fats and oils such as cottonseed oil, soybean oil, corn oil, peanut oil, lard, codliver oil, coconut oil, etc.; forage crops such as alfalfa, clover, hay; grains such as corn, wheat, oats, rice, barley, rye, soybeans; vegetables such as carrots, peas, spinach, beets potatoes, sweet potatoes; nut crops such as peanuts, walnuts, almonds; etc. Methods of applying the products to the material to be preserved may follow conventional techniques, for example, in the case of fats and oils the products may be simply mixed into the material to be preserved; in the case of forage crops and other vegetative materials a solution of the product may be sprayed onto the material to be preserved, in the case of nuts the products mixed with a solution of a suitable binder such as starch, pectin, wax, carboxymethyl cellulose, etc. may be applied as a surface coating.

Among the products of the invention, those which respond to the following formula exhibit especially high antioxidant activity—

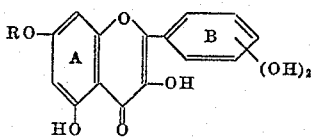

wherein the two hydroxy groups in ring B are in ortho or para relationship to one another and RO— represents the aralkyl ether group at position 7.

An especially valuable aspect of the invention is that it makes possible the preparation of products which have greater antioxidant activity than the starting materials. This situation is explained further as follows having reference to the formula immediately above:

It is known that certain flavonols effectively inhibit the aerobic oxidation of fats and oils. The antioxidant activity of flavonols has been shown to be increased by the presence of a free hydroxyl at position 3 in the pyrone ring and by the presence of two hydroxyl groups in ortho or para relationship in the B ring. On the other hand, the presence of meta-dihydroxy groupings in the 5,7-position of the A ring exerts the opposite effect of decreasing antioxidant activity. Unfortunately, many of the flavones isolatable from plant sources contain this characteristic 5,7-dihydroxy grouping. By application of the process of the invention the hydroxyl group at position 7 is etherified whereby the deleterious effect at the meta dihydroxy grouping is nullified, that is, the antioxidant activity is enhanced. As an example, quercetin may be converted into 7-O-benzyl quercetin which is more effective as an antioxidant than quercetin. A particularly practical aspect of this situation is that by the process of the invention quercetin—the only flavonol readily available in commerce—can be converted into a derivative of greatly improved antioxidant activity. Following the principles above described, other polyhydroxy flavonoids containing two hydroxyls in 5,7-positions can be converted into the 5-hydroxy, 7-ether derivatives with resulting enhanced antioxidant activity. Moreover, by etherifying at the 7-position in accordance with the invention the resulting compounds are of greater utility as antioxidants than the starting compounds in that conversion of the 7-OH group to a 7-ether group increases the solubility of the compound in oily substrates.

Having thus described the invention what is claimed is:

1. The process which comprises reacting 5-hydroxy-3,3′,4′,7-tetraacetyloxy-flavone with benzyl chloride at a temperature not exceeding 60° C. to produce 7-benzyloxy-3,3′,4′,5-tetraacetyloxy-flavone.

2. The process which comprises reacting a compound of the formula

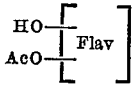

wherein Flav represents a flavonoid nucleus of the group consisting of flavone, flavonol, flavanone, flavanonal, and isoflavone, wherein HO— represents a hydroxyl group attached at the 5-position on said flavonoid nucleus, and wherein AcO— represents an acyloxy group attached at the 7-position on the said flavonoid nucleus, the acyl radical of said acyloxy group being a member of the class consisting of formyl, acetyl, propionyl, and butyryl, with an etherifying agent of the formula R—X wherein R is a member of the class consisting of benzyl and lower alkylbenzyl and wherein X is a member of the class consisting of chlorine, bromine, and iodine, at a temperature not exceeding 60° C. to selectively replace the acyloxy group at position 7 with an ether group of the formula RO—, wherein R is defined as above, and to replace the hydroxyl group at position 5 with an acyloxy group, the acyl radical being as defined above.

3. The process which comprises reacting 5-hydroxy-polyacetyloxy-flavone wherein one of the acetyloxy groups is on the 7-position of the flavone nucleus, with an etherifying agent of the formula R—X wherein R is a member of the class consisting of benzyl and lower alkylbenzyl, and wherein X is a member of the class consisting of chlorine, bromine, and iodine, at a temperature not exceeding 60° C. to selectively replace the acetyloxy group at position 7 with an ether group of the formula RO— wherein R is as defined above and to replace the hydroxy group at position 5 with an acetyloxy group.

References Cited in the file of this patent

Narashimhachari et al.: Chem. Abst., vol. 45, pp 4714–5 (1951).
Shimizu et al.: Chem. Abst., p. 4004 (1952).
Saiyod et al.: J. Chem. Soc., pp. 1737–9 (1937).